UNITED STATES PATENT OFFICE.

ARTHUR W. BROWNE, OF ITHACA, NEW YORK.

PROCESS OF DEHYDRATION.

1,354,279.   Specification of Letters Patent.   Patented Sept. 28, 1920.

No Drawing.   Application filed May 31, 1917. Serial No. 171,937.

*To all whom it may concern:*

Be it known that I, ARTHUR W. BROWNE, a citizen of the United States of America, residing at Ithaca, Tompkins county, New York, have invented a certain new and useful Process of Dehydration, of which the following is a specification.

My invention relates to a process of dehydration, including under the term "dehydration" the removal, from a solid substance, of water, either free or combined as a hydrate, or other forms, as well as the removal from a solid substance of the elements of water, that is hydrogen and oxygen atoms or hydroxyl groups, as in basic salts.

The process consists essentially in subjecting the substance or substances to be treated to the action of a liquid or gaseous non-aqueous solution of one or more of its own decomposition products. The solvent may be either a non-aqueous liquid or gas or a mixture of non-aqueous liquid or gaseous solvents and the substance to be treated may be subjected to the action of a solution of one or more of its solid products of decomposition in a liquid non-aqueous solvent or to the action of a solution of one or more of its gaseous products of decomposition mixed in any suitable proportion with non-aqueous vapors or with other suitable vehicles.

The process is ordinarily carried out under atmospheric pressure but, in certain cases, it is advisable to carry it out under pressure either higher or lower than that of the atmosphere.

I shall illustrate my invention as applied to the dehydration of calcium chlorid either in a more or less hydrated or basic form, the object being to render the calcium chlorid substantially water-free or substantially free from a hydroxyl group as the case may be. From this illustration the application of the principles of the process to other substances will be readily understood by those skilled in the art.

The calcium chlorid to be treated may be subjected to the action of a more or less concentrated solution of hydrogen chlorid gas in a suitable liquid non-aqueous solvent. As such solvent one of the following or mixtures of them may be used viz; carbon tetrachlorid, chloroform, ethyl or methyl alcohol, di-ethyl ether, acetone, benzene or other similar such liquids. I generally prefer to use carbon tetrachlorid.

The calcium chlorid to be treated may, on the other hand, be subjected to the action of a current of hydrogen chlorid gas mixed in any suitable proportion with a non-aqueous vapor or gas, such as the vapors of any of the organic liquid compounds mentioned above or with mixtures of such vapors, or with such gases as carbon dioxid, sulfur dioxid, nitrogen or a mixture of them.

The calcium chlorid to be treated should preferably have as much water as possible removed from it before treatment, by the usual well-known methods of evaporation or evaporation *in vacuo* over sulfuric acid, and the hydrogen chlorid gas before use should preferably be rendered as dry as possible by any of the known methods.

The various non-aqueous liquid solvents mentioned above as a class of substances suitable for use in my process all possess the common property of being volatile at relatively low temperature, that is, considerably below the boiling point of water. For this reason the application of a moderate amount of heat will drive off any residual solvent adhering to the calcium chlorid after the treatment has been completed.

The more or less dilute solvent may of course be treated to recover the hydrochloric acid and the pure solvent therefrom by any suitable well-known means, and the solvent recharged with hydrochloric acid used for a treatment of a fresh lot of hydrated calcium chlorid.

Where in the claims I refer to a "solution" I mean to include as the solvent both liquid and gaseous non-aqueous solvents or mixtures of them and where I refer to "decomposition products" I mean to include such whether in the solid, liquid or gaseous state.

I claim:

1. The process of dehydration consisting in treating a water containing material with a dehydrating agent in a non-aqueous liquid solution.

2. The process of dehydration consisting in treating a water containing material with a dehydrating agent dissolved in a non-aqueous liquid solvent volatile below 100° C.

3. The process of dehydration consisting in treating a water containing material with an anhydrous acid radical in non-aqueous solution.

4. A process of dehydration comprising subjecting an alkaline earth metal chlorid to the action of a non-aqueous solution of hydrogen chlorid.

5. A process of dehydration comprising subjecting an alkaline earth metal chlorid to the action of a non-aqueous solution of hydrogen chlorid, the solvent being volatile at a temperature relatively low compared with the boiling point of water.

6. A process of dehydration comprising subjecting an alkaline earth metal chlorid to the action of a substantially water-free solution of a relatively volatile organic solvent and hydrogen chlorid.

7. A process of dehydration comprising subjecting an alkaline earth metal chlorid to the action of a solution of carbon tetrachlorid and hydrogen chlorid.

8. A process of dehydration comprising subjecting calcium chlorid to the action of a non-aqueous solution of hydrogen chlorid.

9. A process of dehydration comprising subjecting calcium chlorid to the action of a non-aqueous solution of hydrogen chlorid, the solvent being volatile at a temperature relatively low compared with the boiling point of water.

10. A process of dehydration comprising subjecting calcium chlorid to the action of a substantially water-free solution of a relatively volatile organic solvent and hydrogen chlorid.

11. A process of dehydration comprising subjecting calcium chlorid to the action of a solution of carbon tetrachlorid and hydrogen chlorid.

In testimony whereof I have signed this specification.

ARTHUR W. BROWNE